US011511763B2

(12) United States Patent
Horiguchi et al.

(10) Patent No.: US 11,511,763 B2
(45) Date of Patent: Nov. 29, 2022

(54) ELECTRONIC CONTROL DEVICE (71) Applicant: Hitachi Automotive Systems, Ltd., Hitachinaka (JP)

(72) Inventors: Tatsuya Horiguchi, Tokyo (JP); Hideyuki Sakamoto, Hitachinaka (JP); Teppei Hirotsu, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 259 days.

(21) Appl. No.: 16/963,314

(22) PCT Filed: Dec. 14, 2018

(86) PCT No.: PCT/JP2018/046037
§ 371 (c)(1),
(2) Date: Jul. 20, 2020

(87) PCT Pub. No.: WO2019/142563
PCT Pub. Date: Jul. 25, 2019

(65) Prior Publication Data
US 2021/0053580 A1 Feb. 25, 2021

(30) Foreign Application Priority Data

Jan. 22, 2018 (JP) .............................. JP2018-008037

(51) Int. Cl.
*B60W 50/00* (2006.01)
*B60W 50/06* (2006.01)
*B60W 50/02* (2012.01)

(52) U.S. Cl.
CPC ........ *B60W 50/06* (2013.01); *B60W 50/0097* (2013.01); *B60W 50/0205* (2013.01);
(Continued)

(58) Field of Classification Search
CPC ............. B60W 50/06; B60W 50/0097; B60W 50/0205; B60W 2050/021;
(Continued)

(56) References Cited

U.S. PATENT DOCUMENTS

2011/0190972 A1* 8/2011 Timmons ............... G01C 21/34
701/31.4
2016/0325743 A1* 11/2016 Schmüdderich .. B60W 50/0097
(Continued)

FOREIGN PATENT DOCUMENTS

JP 2009-002794 A 1/2009
JP 2009-61942 A 3/2009
(Continued)

OTHER PUBLICATIONS

International Search Report with English translation and Written Opinion issued in corresponding application No. PCT/JP2018/046037 dated Mar. 12, 2019.
(Continued)

*Primary Examiner* — Ian Jen
(74) *Attorney, Agent, or Firm* — Foley & Lardner LLP (57) ABSTRACT

An electronic control device including a sensor fusion processing unit that integrates a plurality of pieces of sensor information having been input from a plurality of sensors. The electronic control device further including a behavior prediction processing unit that obtains a future value in which a future behavior of a target object is predicted based on joint information integrated by the sensor fusion processing unit. The electronic control device further including a comparison unit that compares a future value predicted by the behavior prediction processing unit with output information of each sensor of the sensor fusion processing unit at a predicted time.

12 Claims, 4 Drawing Sheets

(52) U.S. Cl.
CPC .............. *B60W 2050/021* (2013.01); *B60W 2050/0215* (2013.01); *B60W 2050/065* (2013.01); *B60W 2420/42* (2013.01); *B60W 2420/52* (2013.01)

(58) Field of Classification Search
CPC ... B60W 2050/0215; B60W 2050/065; B60W 2420/42; B60W 2420/52; B60W 50/14; B60W 60/0027; G06K 9/6288; G06V 20/56; G08G 1/166; G01S 13/931
See application file for complete search history.

(56) References Cited

U.S. PATENT DOCUMENTS

| | | |
|---|---|---|
| 2017/0372149 A1 | 12/2017 | Mori |
| 2019/0187675 A1 | 6/2019 | Horiguchi et al. |
| 2020/0070847 A1 | 3/2020 | Horiguchi |

FOREIGN PATENT DOCUMENTS

| | | |
|---|---|---|
| JP | 2011-002355 A | 1/2011 |
| JP | 2016-212872 A | 12/2016 |
| JP | 2017-227580 A | 12/2017 |
| WO | WO-2017/199652 A1 | 11/2017 |
| WO | WO-2018/198547 A1 | 11/2018 |

OTHER PUBLICATIONS

Office Action Issued in corresponding Japanese Patent Application No. 2018-008037 dated Apr. 28, 2021, with English Machine Translation.

* cited by examiner

| SECOND COMPARISON UNIT OUTPUT 106 | FIRST COMPARISON UNIT OUTPUT 105 | ABNORMALITY DETERMINATION RESULT 107 |
|---|---|---|
| CONSISTENT | TIME SYNCHRONIZATION VALUE 42 OF FIRST SENSOR 11 IS INCONSISTENT | ABNORMALITY IN FIRST SENSOR 11 or FIRST SENSOR TIME SYNCHRONIZATION VALUE |
| | TIME SYNCHRONIZATION VALUE 43 OF SECOND SENSOR 12 IS INCONSISTENT | ABNORMALITY IN SECOND SENSOR 12 or SECOND SENSOR TIME SYNCHRONIZATION VALUE |
| | SURROUNDING OBJECT PREDICTION MAP 8 AT TIME T+1 IS INCONSISTENT | SENSOR FUSION PROCESSING ABNORMALITY |
| | ALL THREE ARE CONSISTENT | NO ABNORMALITY |
| | ALL THREE ARE INCONSISTENT | DETECT ONLY ABNORMALITY OCCURRENCE |
| INCONSISTENT | TIME SYNCHRONIZATION VALUE 42 OF FIRST SENSOR 11 IS INCONSISTENT | ABNORMALITY IN FIRST SENSOR 11 or FIRST SENSOR TIME SYNCHRONIZATION VALUE |
| | TIME SYNCHRONIZATION VALUE 43 OF SECOND SENSOR 12 IS INCONSISTENT | ABNORMALITY IN SECOND SENSOR 12 or SECOND SENSOR TIME SYNCHRONIZATION VALUE |
| | SURROUNDING OBJECT PREDICTION MAP 8 AT TIME T+1 IS INCONSISTENT | SENSOR FUSION PROCESSING ABNORMALITY |
| | ALL THREE ARE CONSISTENT | ABNORMALITY IN FIRST COMPARISON UNIT OUTPUT 105 or SECOND COMPARISON UNIT OUTPUT 106 |
| | ALL THREE ARE INCONSISTENT | DETECT ONLY ABNORMALITY OCCURRENCE |

ELECTRONIC CONTROL DEVICE

TECHNICAL FIELD

The present invention relates to an electronic control device, and particularly to an electronic control device suitable for an automatic drive system and the like.

BACKGROUND ART

As an example of a vehicle traveling control device capable of restraining a speed adjustment device from being operated based on abnormal target control quantity as abnormality occurs with main traveling state detection means, PTL 1 describes a technique in which the vehicle traveling control device is provided with a drive system rotation sensor which detects the traveling state of a vehicle other than a wheel speed sensor; when performing automatic traveling control by an automatic traveling control ECU and when the vehicle speed calculated based on the detection result by the drive system rotation sensor conforms to abnormality determination conditions, an engine ECU does not perform automatic traveling control but performs normal control of an engine; and thus, by setting the abnormality determination conditions based on the detection result by the drive system rotation sensor to the engine ECU, the abnormality occurring at the wheel speed sensor can be detected.

CITATION LIST

Patent Literature

PTL 1: JP 2009-61942 A

SUMMARY OF INVENTION

Technical Problem

Towards realization of an advanced automatic drive system, an automatic drive electronic control unit (ECU), which is a high-level control device that controls automatic drive, is required to continue the operation for a certain period of time until the operation is taken over to the driver and to stop the operation safely even when a failure occurs in the automatic drive system.

Examples of such failure include an abnormality occurring during a calculation on an arithmetic processing unit (hereinafter, microcomputer) that performs a calculation for automatic drive control and an abnormality occurring in a sensor.

In order to realize the operation continuation for a certain period of time described above, it is necessary to detect these abnormalities and switch to the control corresponding to the abnormality.

In detecting such a failure and an abnormality, a method of multiplexing the arithmetic processing and the sensor and comparing the outputs, and a method of verifying the validity of an arithmetic result and a sensor output value by using another sensor value and arithmetic result are used in general.

Of these, multiplexing has problems such as large-scale complexity of the system due to an increase in the number of sensors and an increase in the arithmetic load, and a method of performing validity verification is required. PTL 1 discloses an example of a device that uses a different type of sensor to detect and correct a sensor value deviation for detecting an own vehicle state amount, and describes an abnormality detection method by evaluating the validity of a sensor output value.

On the other hand, although PTL 1 describes the verification method that can detect a failure or an abnormality occurring in a certain sensor by using another sensor, it does not describe means for detecting an abnormality occurring in the sensor for verification.

An automatic drive ECU simultaneously uses a plurality of sensors to recognize a surrounding object in such a manner as to complement the characteristics of each sensor, and hence it is necessary to perform complementary verification and abnormality detection using various sensors. In addition, a calculation using a microcomputer is required for sensor verification, and verification is also required for this calculation.

Individual addition of sensors and logics for these verifications as in the technique described in PTL 1 causes large-scale complexity of the system and an increase in the arithmetic load as described above.

An object of the present invention is to provide an electronic control device generating low heat due to a simplified configuration and a reduced verification arithmetic load without performing multiplexing of sensors and calculations.

Solution to Problem

The present invention provides a plurality of means for solving the above problem, and one of the examples includes: a sensor fusion processing unit that integrates a plurality of pieces of sensor information having been input from a plurality of sensors; a behavior prediction processing unit that obtains a future value in which a future behavior of a target object is predicted based on joint information integrated by the sensor fusion processing unit; and a comparison unit that compares a future value predicted by the behavior prediction processing unit with output information from each sensor of the sensor fusion processing unit at a predicted time.

Advantageous Effects of Invention

According to the present invention, the abnormality detection occurring in arithmetic processing in the sensors and the ECU can be realized with a low arithmetic load without using the multiplexed, additional sensors. Problems, configurations, and effects other than those described above will be apparent by the following description of the embodiments.

DESCRIPTION OF EMBODIMENT

An embodiment of an electronic control device of the present invention will be described with reference to FIGS. 1 to 7. FIGS. 1 to 7 describe an example of a case where the electronic control device is applied to automatic drive or an automatic drive system for supporting automatic drive of an automobile.

[Overall Configuration]

Figure 1:
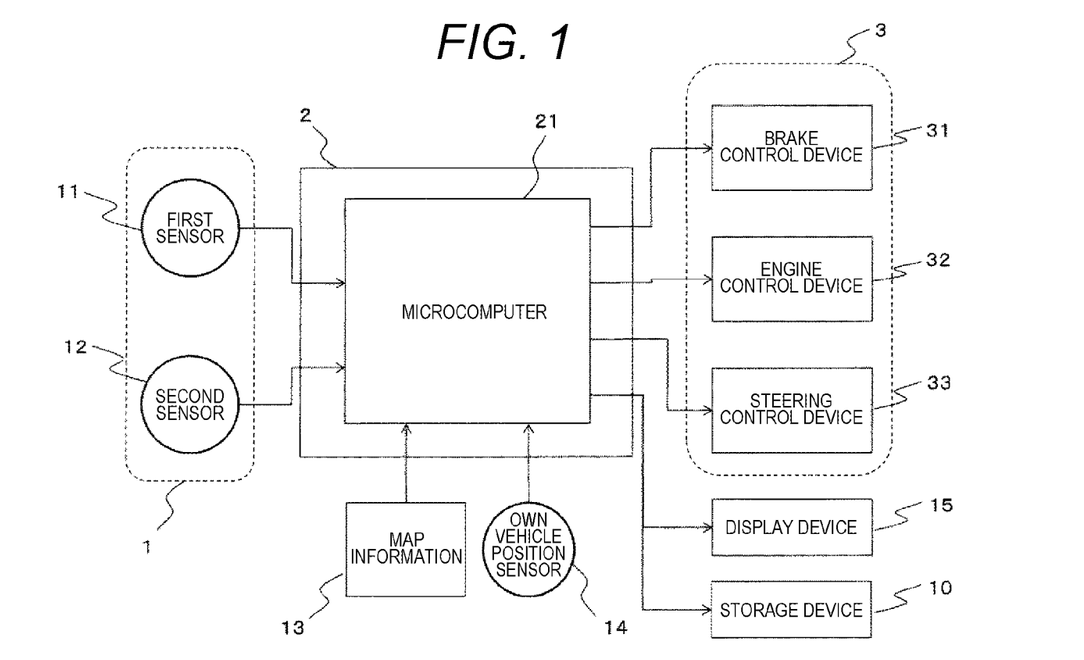
FIG. 1 is a block diagram illustrating a system configuration of an electronic control device according to a first embodiment of the present invention.

First, the overall configuration of the automatic drive system to which the electronic control device of the present invention is applied will be described with reference to FIG. 1. FIG. 1 illustrates the overall configuration of the automatic drive system in the present embodiment.

As illustrated in FIG. 1, based on external information given from an external information observation equipment group 1 constituted by a first sensor 11 and a second sensor 12 that are individually capable of acquiring own vehicle surrounding information such as a millimeter-wave radar and a camera, map information 13, and information from an own vehicle position sensor 14, the present system performs arithmetic processing related to automatic drive using a microcomputer 21 in an automatic drive ECU 2, and transmits a control command value to each of various low-level ECU groups 3 constituted by a brake control device 31, an engine control device 32, a steering control device 33, and the like.

The data input from the external information observation equipment group 1 to the automatic drive ECU 2 may be raw data that is output directly from a sensor or data pre-processed by an ECU dedicated to each sensor.

The first sensor 11 and the second sensor 12 that are used include at least one of a radar and a camera, but they can be any other various publicly known radar sensors or image capturing devices. In addition, the number thereof is not limited to two but may be three or more.

Figure 2:
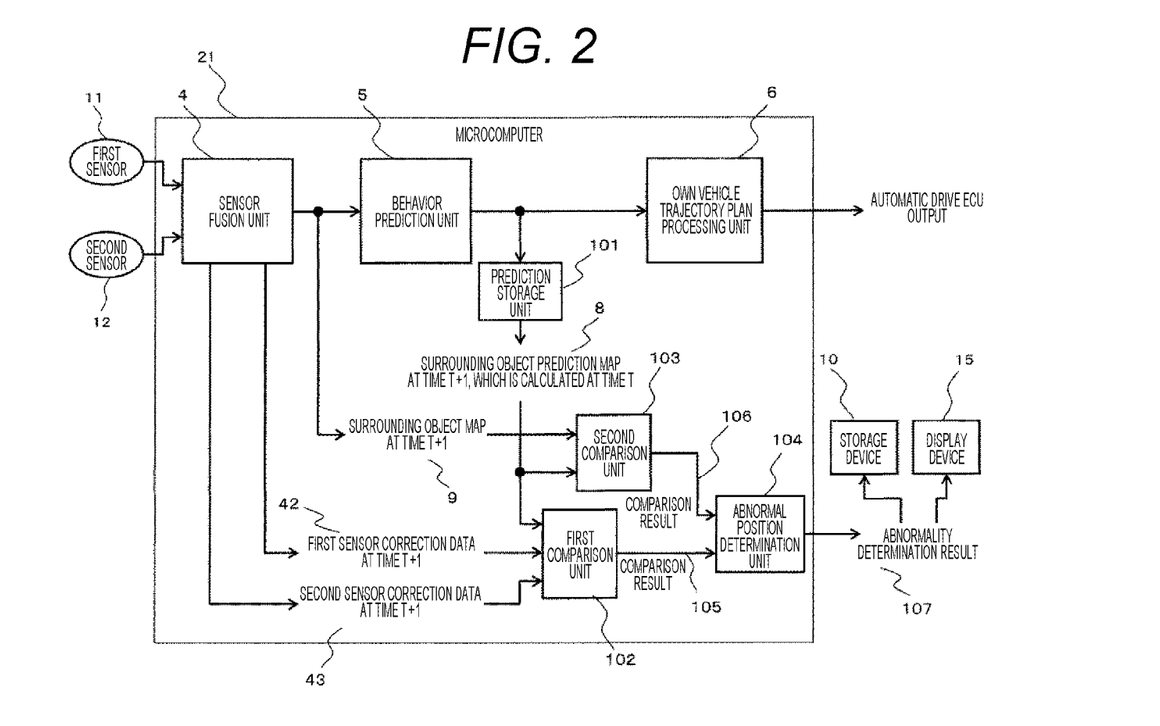
FIG. 2 is a diagram illustrating the relationship between each configuration and a processing flow in the electronic control device according to the first embodiment of the present invention.

First, a configuration specific to the present invention and a relevant configuration will be described with reference to FIG. 2. FIG. 2 illustrates the configuration specific to the present invention.

As illustrated in FIG. 2, the electronic control device of the present embodiment includes, inside the microcomputer 21 illustrated in FIG. 1, a sensor fusion processing unit 4, a behavior prediction processing unit 5, an own vehicle trajectory plan processing unit 6, a prediction storage unit 101, a first comparison unit 102, a second comparison unit 103, and an abnormal position determination unit 104, and includes, outside the microcomputer 21, a storage device 10 and a display device 15.

The sensor fusion processing unit 4 receives input of a sensor detection value from each of the first sensor 11 and the second sensor 12, and executes integration processing that synchronizes the times of a plurality of pieces of sensor information. An own vehicle surrounding map (joint information, output information) 7 at a time T generated as a result of time synchronization processing is output to the behavior prediction processing unit 5, and first sensor correction data and second sensor correction data at the time T are output to the first comparison unit 102. At the time T+1 second, an own vehicle surrounding map (joint information, output information) 9 at the time T+1 second is output to the behavior prediction processing unit 5, and first sensor correction data 42 and second sensor correction data 43 at the time T+1 are output to the first comparison unit 102.

Based on the own vehicle surrounding map 7 at the time T input from the sensor fusion processing unit 4, the behavior prediction processing unit 5 obtains a surrounding object prediction map (future value) 8 in which the behavior of the target object at the time T+1 is predicted. The obtained surrounding object prediction map 8 is output to the own vehicle trajectory plan processing unit 6 and the prediction storage unit 101.

The own vehicle trajectory plan processing unit 6 generates an own vehicle trajectory based on the surrounding object prediction map 8 at the time T+1 input from the behavior prediction processing unit 5. The generated own vehicle trajectory information is output to the low-level ECU group 3.

The prediction storage unit 101 temporarily stores the surrounding object prediction map 8 input from the behavior prediction processing unit 5, and outputs at an appropriate timing the temporarily stored surrounding object prediction map 8 to the first comparison unit 102 and the second comparison unit 103.

The first comparison unit 102 compares the surrounding object prediction map 8 at the time T+1 second, which is calculated at the time T predicted by the behavior prediction processing unit 5, with the first sensor correction data 42 and the second sensor correction data 43 at the time T+1 second, which are input from the sensor fusion processing unit 4 at the predicted time T+1 second. A first comparison unit output (output information) 105, which is a comparison result, is output to the abnormal position determination unit 104.

The first comparison unit 102 compares the surrounding object prediction map 8 having been input with the output information of each of the first sensor 11 and the second sensor 12 of the sensor fusion processing unit 4 at the predicted time, and determines whether or not the reliability, that is, the accuracy of the surrounding object prediction map 8 is sufficiently ensured for the calculation. For example, if the difference is equal to or greater than a predetermined reference value as a result of the comparison, it is determined that the arithmetic processing accuracy of the surrounding object prediction map 8 by the behavior prediction processing unit 5 has been reduced, and an abnormality is output as the first comparison unit output 105.

The second comparison unit 103 compares the surrounding object prediction map 8 at the time T+1 calculated at the time T having been input, with the own vehicle surrounding map 9 at the predicted time T+1. A second comparison unit output (output information) 106, which is a comparison result, is output to the abnormal position determination unit 104.

The second comparison unit 103 also compares the surrounding object prediction map 8 having been input with the own vehicle surrounding map 9 of the sensor fusion processing unit 4 at the predicted time, and determines whether or not the reliability, that is, the accuracy of the own vehicle surrounding map 9 is sufficiently ensured for the calculation. For example, if the difference is equal to or greater than a predetermined reference value as a result of the comparison, it is determined that the arithmetic processing accuracy of the own vehicle surrounding map 9 by the sensor fusion processing unit 4 has been reduced, and an abnormality is output as the second comparison unit output 106.

When the first comparison unit 102 and the second comparison unit 103 detect an abnormality over a plurality of times (e.g., detect the same object or position five times or more in a row), it can be determined to be an abnormal state in which the reliability has been reduced.

Based on the first comparison unit output 105 and the second comparison unit output 106 that have been input, the abnormal position determination unit 104 obtains an abnormality determination result 107, which is information regarding which of the first sensor 11, the second sensor 12, the sensor fusion processing unit 4, the first comparison unit 102, and the second comparison unit 103 has an abnormality, based on the first comparison unit output 105 of the first comparison unit 102 and the second comparison unit output 106 of the second comparison unit 103.

If the obtained abnormality determination result 107 indicates an abnormality, the abnormal position determination unit 104 outputs a signal indicating an abnormality to each of the various low-level ECU groups 3 and causes it to execute abnormality response processing. In addition, in order to notify a person on board on the automobile of the reduction in reliability, the abnormal position determination unit 104 outputs a display signal for the display device 15 to display a message of the reduction in reliability of the electronic control device. At the same time, the abnormal position determination unit 104 outputs, to the storage device 10, a determination record of a specified time before and after the time of detection of the reduction in reliability and the information of the time.

When the abnormality determination result 107 indicates an abnormality, the low-level ECU group 3 executes various abnormality response processing upon receiving an input of the abnormality signal.

As the abnormality response processing, when the automobile on which the electronic control device is mounted is in fully automatic operation, the low-level ECU group 3 executes various types of controls such as slowing down so as to stop the vehicle safely or stopping the vehicle off the road. In addition, when the driver is on board and it is possible for the driver to continue driving, the low-level ECU group 3 gives a warning to the driver and executes various controls for switching from automatic drive to the driver's manual drive. The abnormality response processing is not limited to the above-described control, and various controls can be executed.

When receiving an input of the abnormality determination result 107 indicating an abnormality from the abnormal position determination unit 104, the storage device 10 stores the determination record of a specified time before and after the time of detection of the reduction in reliability and the information of the time.

Figure 3:
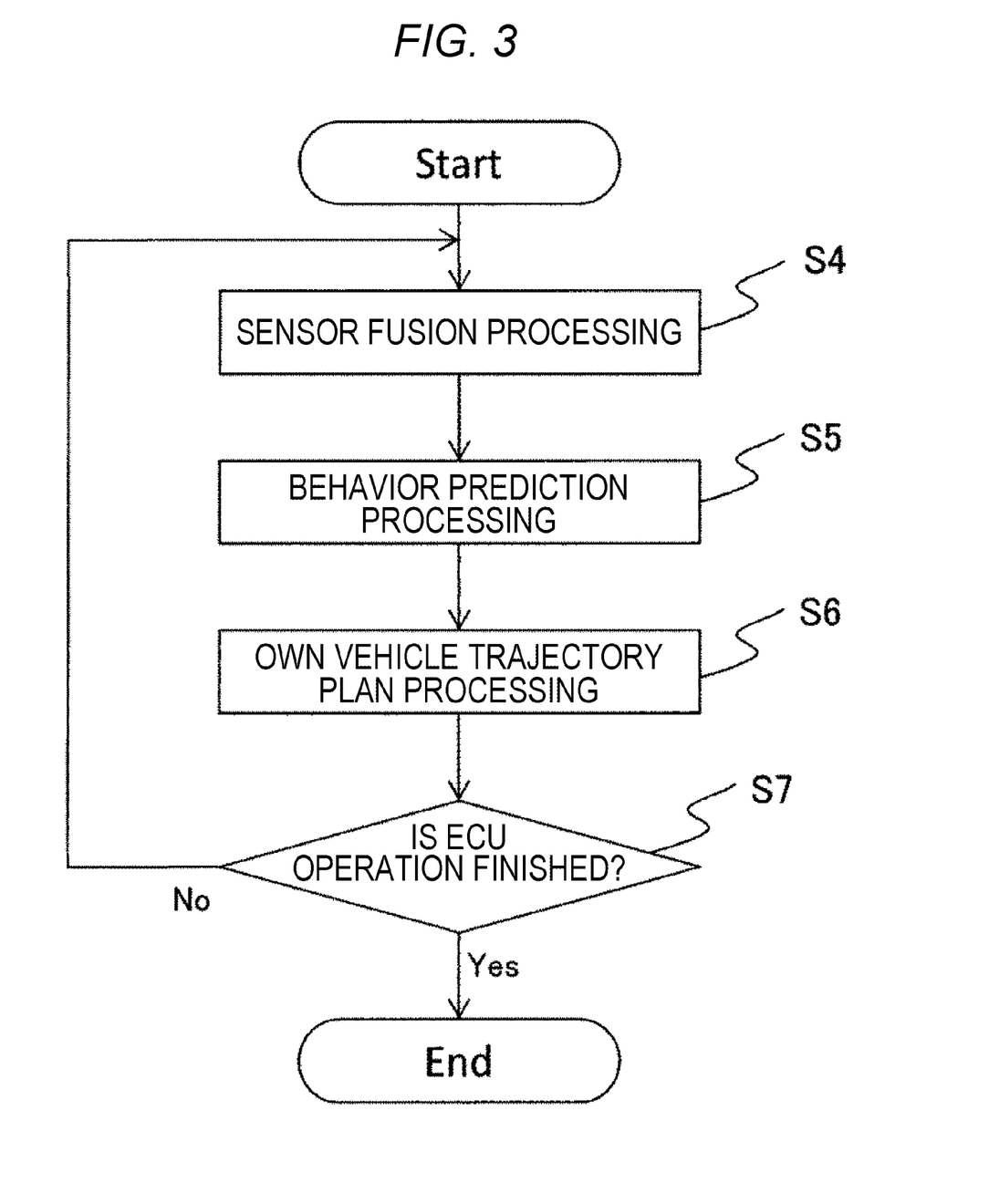
FIG. 3 is a flowchart presenting a processing procedure performed in an automatic drive ECU in the electronic control device according to the first embodiment of the present invention.

Next, an example of the automatic drive processing will be described with reference to FIG. 3. FIG. 3 illustrates a processing flow of main function processing of automatic drive performed by the microcomputer 21.

As illustrated in FIG. 3, while the automatic drive ECU 2 is in operation, the microcomputer 21 executes each arithmetic processing of sensor fusion processing (step S4) in which various pieces of external information given from the external information observation equipment group 1 are integrated by the sensor fusion processing unit 4, behavior prediction processing (step S5) in which the behavior of a surrounding object is predicted by the behavior prediction processing unit 5 using an own vehicle surrounding map obtained as a result of the sensor fusion processing in step S4, and own vehicle trajectory plan processing (step S6) in which an own vehicle trajectory is generated by the own vehicle trajectory plan processing unit 6 based on the behavior prediction of the surrounding object obtained as a result of the behavior prediction processing in step S5.

The processing from step S4 to step S6 is continued until the operation of the automatic drive ECU 2 is finished (No in step S7), and is finished when the operation is finished (Yes in step S7).

Figure 4:
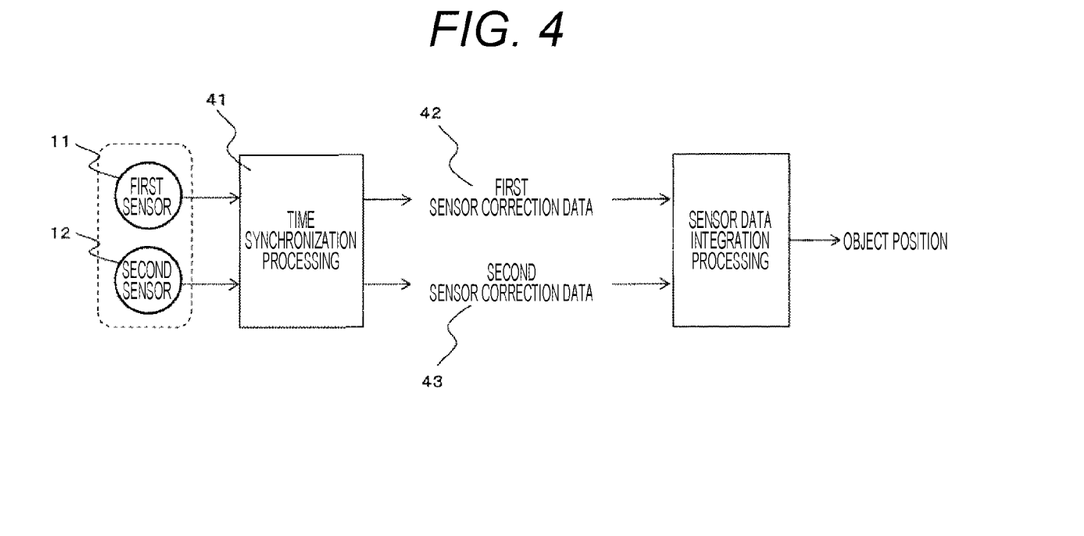
FIG. 4 is a diagram illustrating a processing flow in a sensor fusion processing unit in the electronic control device according to the first embodiment of the present invention.

Next, the sensor fusion processing will be described in detail with reference to FIG. 4. FIG. 4 illustrates an outline of the internal processing of the sensor fusion processing unit 4.

As illustrated in FIG. 4, the sensor data given from the first sensor 11 and the second sensor 12 to the automatic drive ECU 2 is out of time synchronization. For this reason, after first receiving the sensor data with the time stamp, the sensor fusion processing unit 4 needs to perform time synchronization processing by a time synchronization processing unit 41.

Thereafter, the position coordinate of each surrounding object is output based on the first sensor correction data 42 and the second sensor correction data 43 for which the time synchronization processing by the time synchronization processing unit 41 has been completed. By referring to the own vehicle surrounding map from the map information 13 using the sensor value by the own vehicle position sensor 14 in addition to the position coordinate of each surrounding object, the own vehicle surrounding object position is mapped. The first sensor correction data 42 and the second sensor correction data can be obtained by interpolation processing such as interpolation of an input value of each sensor before and after the time synchronization processing. The interpolation method may be performed by various publicly known methods.

Figure 5:
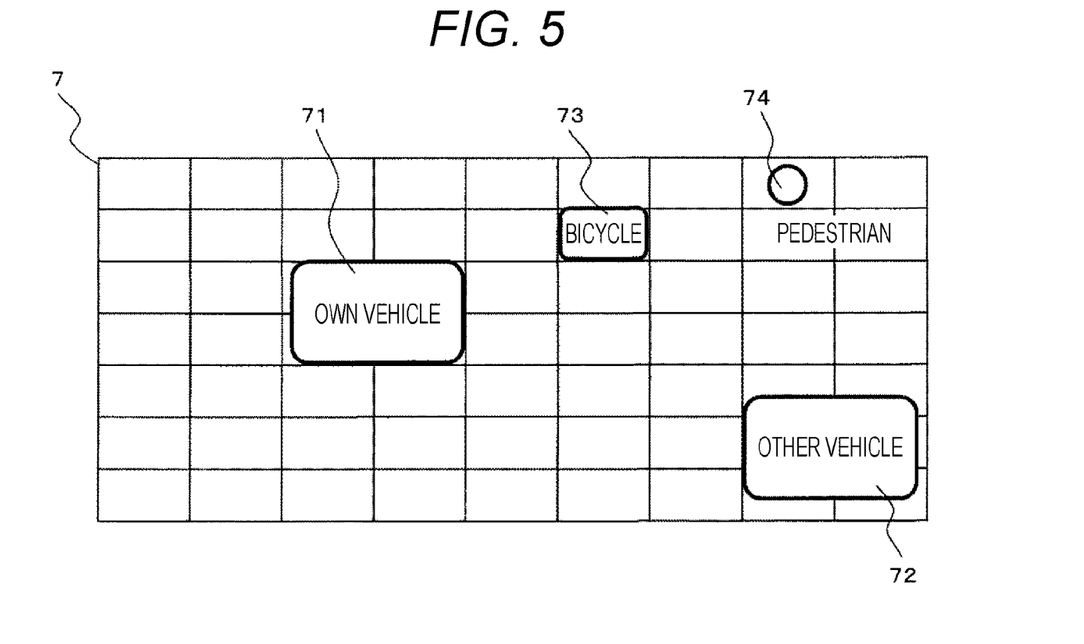
FIG. 5 is a view illustrating an example of an own vehicle surrounding map obtained by the sensor fusion processing unit in the electronic control device according to the first embodiment of the present invention.

FIG. 5 illustrates an example in which the position, size, and moving speed information of an own vehicle surrounding object detected by the first sensor 11 and the second sensor 12 are integrated using the sensor fusion processing unit 4 described above, and each object is plotted on the own vehicle surrounding map 7.

In the present embodiment, an other vehicle position 72, a bicycle position 73, and a pedestrian position 74, in addition to an own vehicle position 71, are mapped on the own vehicle surrounding map 7 in FIG. 5.

Subsequently, behavior prediction processing is performed on the microcomputer 21 based on the own vehicle surrounding map 7 generated by the sensor fusion processing unit 4. The behavior prediction processing unit 5 performs behavior prediction of various surrounding objects mapped on the own vehicle surrounding map 7. The prediction methods include, for example, a method of extrapolating a future position based on the current position and speed of each surrounding object, but a variety of other publicly known methods can be used.

Figure 6:
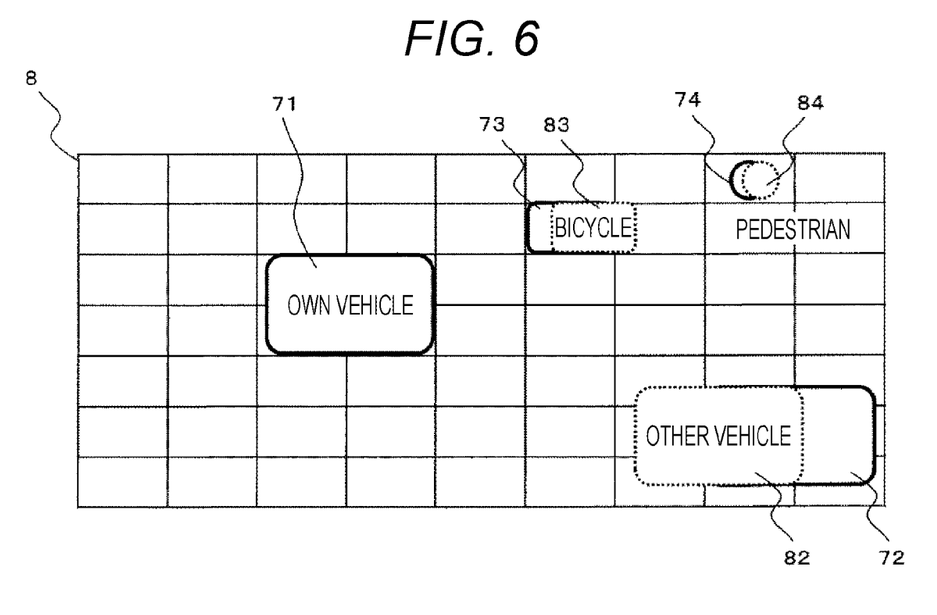
FIG. 6 is a view illustrating an example of a surrounding object prediction map obtained by a behavior prediction processing unit in the electronic control device according to the first embodiment of the present invention.

The behavior prediction processing unit 5 obtains the surrounding object prediction map 8 indicating future prediction of the own vehicle surrounding object as illustrated in FIG. 6, and maps the prediction positions of an other vehicle prediction position 82, a bicycle prediction position 83, and a pedestrian prediction position 84 as the surrounding object prediction map 8.

In FIG. 6, for the purpose of explanation, the prediction positions of the objects by the behavior prediction processing unit 5 are indicated by the dotted lines, and the other vehicle position 72, the bicycle position 73, and the pedestrian position 74, which are the results of the sensor fusion processing unit 4, are indicated by the solid lines. However, the actual result by the behavior prediction processing unit 5 does not necessarily include these actual positions.

Although FIG. 6 illustrates only one prediction position of each object, as many prediction positions of each object as necessary for the own vehicle trajectory plan processing unit 6 are generated. For example, when the own vehicle trajectory plan processing unit 6 plans the own vehicle trajectory for 10 seconds every 100 milliseconds, up to 100 (for 10 seconds every 100 milliseconds) prediction positions for each object are generated.

Using the prediction position for each object, own vehicle trajectory plan processing is performed on the microcomputer 21, thereby generating the own vehicle trajectory. The main function processing of the automatic drive ECU 2 is completed by generating and transmitting a control command value to the low-level ECU group 3 that satisfies the own vehicle trajectory.

The processing method specific to the present invention of the sensor fusion processing unit 4, the behavior prediction processing unit 5, and the abnormality detection of sensor input values in the main function processing flow of the automatic drive ECU 2 in the electronic control device described above will be described below.

The main function processing of the automatic drive ECU 2 is periodic processing, and, after the end of a series of processing starting at a certain time T, the same processing is started again at a next time T+1.

In the automatic drive ECU 2 of the present embodiment, when the series of processing is performed at the certain time T, the surrounding object prediction map 8 at the time T+1 calculated at the time T as a processing result of the behavior prediction processing unit 5 is stored in the prediction storage unit 101.

Thereafter, when a similar series of processing is performed at the time T+1, the first comparison unit 102 compares the three, a time synchronization value (first sensor correction data 42) of the first sensor at the time T+1 and a time synchronization value (second sensor correction data 43) of the second sensor at the time T+1 that are obtained from the time synchronization value in the sensor fusion processing unit 4 and the surrounding object prediction map 8 at the time T+1 calculated at the time T stored in the prediction storage unit 101.

The comparison arithmetic in the first comparison unit 102 can be realized by a processing method using a threshold value, such as determining whether or not the three of the surrounding object prediction map 8 at the time T+1 calculated at the time T+1, the first sensor correction data 42 of the first sensor 11 at the time T+1, and the second sensor correction data 43 of the second sensor 12 at the time T+1 exist in a predetermined threshold value.

The determination processing can include, as an example, a method of assuming a center point obtained from the position coordinate detected or predicted independently by the three and calculating a deviation from the center point. In addition, it is also possible to mount an accuracy improvement method including center point position correction in which weight is given in accordance with sensor characteristics such as a relative distance from and an angle with the own vehicle when the center point is calculated.

In this manner, by performing a consistency determination with a range by comparison of the obtained distance and the threshold value, a majority determination based on the sensor error can be performed.

Thus, the first comparison unit output 105 indicating the presence or absence of an outlier as a majority result and an input source when the outlier exists is obtained as a comparison result of the first comparison unit 102.

Similarly, using the surrounding object prediction map 8 at the time T+1 calculated at the time T stored in the prediction storage unit 101, and the own vehicle surrounding map 9 at the time T+1, which is the arithmetic result of the sensor fusion processing unit 4, the second comparison unit 103 performs consistency determination using a threshold value for each object.

Similar to the processing in the first comparison unit 102, in the processing in the second comparison unit 103, by performing, on two data, consistency determination that allows an error such as that in the processing in the first comparison unit 102, the second comparison unit output 106 indicating whether or not the two data have been consistent with each other within a range of a predetermined threshold value is obtained.

Based on the two outputs of the first comparison unit output 105 and the second comparison unit output 106 that are obtained by the above processing, the abnormal position determination unit 104 can detect each abnormality generated in the first sensor 11, the second sensor 12, the sensor fusion processing unit 4, and the behavior prediction processing unit 5.

Figure 7:
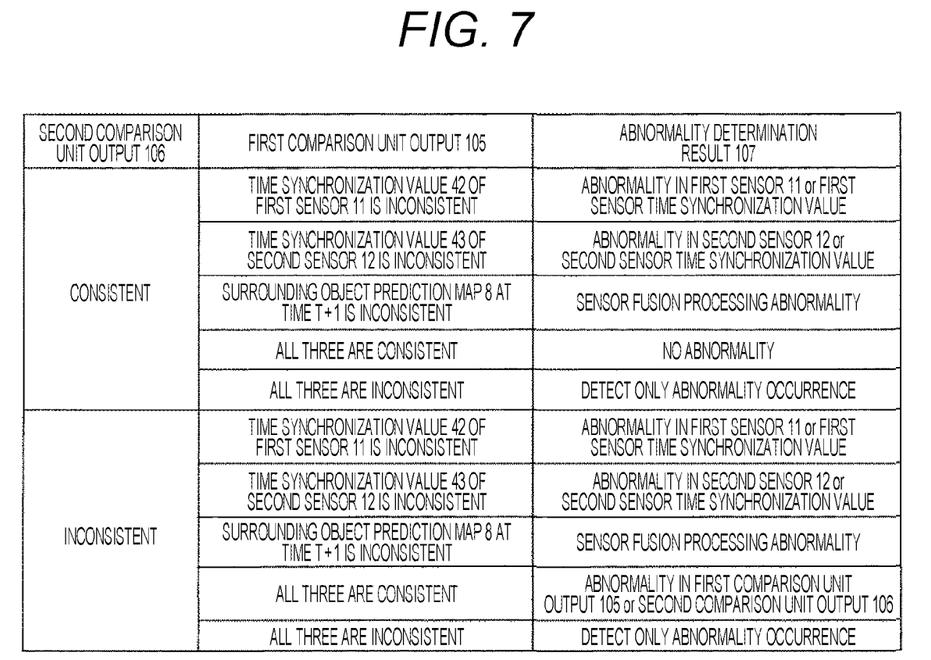
FIG. 7 is a table illustrating a failure position determination method in the electronic control device according to the first embodiment of the present invention.

FIG. 7 illustrates an abnormal position determination method in accordance with the output of each comparison unit. In the present invention, as illustrated in the figure, the validity of the surrounding object prediction map 8 at the time T+1 and the validities of the first sensor 11 and the second sensor 12 as a result of the behavior prediction processing unit 5 at the time T are simultaneously verified by the first comparison unit 102 and its output 105. Since the first comparison unit 102 performs a majority determination that allows an error within the threshold value, the presence or absence of an abnormality and, when the abnormality is detected, the abnormal portion are output.

With this configuration, by the second comparison unit 103 comparing the data with the result of the sensor fusion processing unit 4 at the time T+1, the validity of the surrounding object prediction map 8 at the time T+1, that is, the processing result of the sensor fusion processing unit 4 is verified.

From the above, it is possible to detect the presence or absence of an abnormality and the abnormality occurrence position at each position of the first sensor 11, the second sensor 12, the sensor fusion processing unit 4, and the behavior prediction processing unit 5 without performing calculation or multiplexing of sensors.

However, on an assumption that the sensor fusion processing unit 4 at the certain time T has been correctly completed, the present invention is configured to detect an abnormality in the behavior prediction processing unit 5 at the time T, the first sensor 11 and the second sensor 12 at the time T+1, and the sensor fusion processing unit 4, and the reliability of the abnormality determination result 107 depends on the sensor fusion processing unit 4 at the time T.

Therefore, only at the time (a time 0) when automatic drive is started, the verification method by the sensor fusion processing unit 4 does not exist, and subsequent verification cannot be performed. Therefore, validity verification of the first sensor 11, the second sensor 12, and the sensor fusion processing unit 4 at the time 0 is needed separately.

Methods for this include, for example, detecting a surrounding landmark by the sensor fusion processing unit 4 using the map information 13 at the time 0 and a time 1 as a phase before the start of automatic drive, performing consistency determination in consideration of the movement amount of the own vehicle, and verifying the validity of the first sensor 11, the second sensor 12, and the sensor fusion processing unit 4 by configuring a time multiplex system.

Then, if the validity of the first sensor 11, the second sensor 12, and the sensor fusion processing unit 4 has been verified, the automatic drive is started at the time 1, and if the validity has not been verified (inconsistency has been detected), the same detection is repeated until the automatic drive start time specified by the system, and in the case where the detection of inconsistency continues, the start of the automatic drive processing is prohibited.

Next, effects of the present embodiment will be described.

The electronic control device according to the present embodiment described above includes the sensor fusion processing unit 4 that integrates a plurality of pieces of sensor information having been input from the plurality of first sensors 11 and second sensors 12, the behavior prediction processing unit 5 that obtains the surrounding object prediction map 8 in which a future behavior of a target object is predicted based on the own vehicle surrounding map 9 integrated by the sensor fusion processing unit 4, and the first comparison unit 102 that compares the surrounding object prediction map 8 predicted by the behavior prediction processing unit 5 with output information of each of the first sensors 11 and the second sensors 12 of the sensor fusion processing unit 4 at a predicted time.

With the above method, it is possible to detect an abnormality occurring in each of the external information observation equipment group 1 used in the automatic drive ECU 2 and the sensor fusion processing unit 4 and the behavior prediction processing unit 5 in the automatic drive ECU 2 without multiplexing them.

Furthermore, this method is based on comparison arithmetic processing using information obtained in the process of the main function processing of the automatic drive ECU 2, and can realize an electronic control device generating low heat due to a simplified system configuration and a reduced verification arithmetic load, the electronic control device being suitable for a system requiring verification of the sensor and processing in the ECU.

In addition, since the first comparison unit 102 decides by majority the surrounding object prediction map 8 having been input and the output information of each of the first sensor 11 and the second sensor 12 of the sensor fusion processing unit 4 at the predicted time, it is possible to execute a highly accurate determination of the presence or absence of an abnormality and the abnormal position at the time when an abnormality is detected.

Moreover, the first comparison unit 102 further determines the reliability of the surrounding object prediction map 8 by comparing the surrounding object prediction map 8 having been input with the output information of each of the first sensor 11 and the second sensor 12 of the sensor fusion processing unit 4 at the predicted time, and it is hence possible to maintain high accuracy in determining the abnormality.

In addition, by further providing the second comparison unit 103 that compares the surrounding object prediction map 8 having been input with the own vehicle surrounding map 9 of the sensor fusion processing unit 4 at the predicted time, it is possible to further execute the abnormality determination from a different viewpoint and to execute a further highly accurate abnormality determination.

Moreover, the second comparison unit 103 compares the surrounding object prediction map 8 having been input with the own vehicle surrounding map 9 of the sensor fusion processing unit 4 at the predicted time, thereby determining the reliability of the own vehicle surrounding map 9 of the sensor fusion processing unit 4, and it is hence possible to keep the accuracy of abnormality determination even higher.

In addition, it is possible to obtain the effect that the abnormal position can be easily identified by further providing the abnormal position determination unit 104 that determines which of the first sensor 11, the second sensor 12, the sensor fusion processing unit 4, the first comparison unit 102, and the second comparison unit 103 has an abnormality based on the first comparison unit output 105 of the first comparison unit 102 and the second comparison unit output 106 of the second comparison unit 103.

Moreover, when the comparison result is determined to have equal to or less than a predetermined accuracy, the first comparison unit 102 or the second comparison unit 103 determines that the reliability has been reduced, and it is hence possible to keep the accuracy of abnormality determination even higher.

In addition, the first comparison unit 102 or the second comparison unit 103 determines that the reliability has been reduced when the comparison result is determined to have equal to or less than a predetermined accuracy for equal to or more than a predetermined number of times in a row, and it is hence possible to exclude an instantaneous abnormality caused by sensor characteristics, noise, and the like, and to avoid a situation in which the abnormality response processing is frequently executed.

Moreover, when a reduction in reliability is detected, by notifying the reduction in reliability of the electronic control device to the outside of the device, it is hence possible for humans and devices involved in the system in which the electronic control device is used to grasp that the abnormality response control is performed, thereby allowing a prompt response to be made.

In addition, by further providing the storage device 10 that leaves a determination record when a reduction in reliability is detected, it becomes easy to execute an analysis of the cause of the abnormality when an abnormality occurs, and it is also possible to identify the abnormal position more easily.

Moreover, by leaving a determination record of a specified time before and after the time of detection of the reduction in reliability, the storage device 10 can execute an analysis of the cause of the abnormality more easily, thereby making it even easier to identify the abnormal position.

In addition, the electronic control device is used for an automatic drive system of an automobile, and when a reduction in reliability is detected, by using the display device 15 to notify a person on board on the automobile of the reduction in reliability of the electronic control device, it is possible to quickly take measures such as stopping the automobile and to provide a safe system.

Moreover, since the first sensor 11 and the second sensor 12 that are used include at least one of a radar and a camera, the electronic control device of the present invention can be applied to a sensor frequently used for automatic drive.

<Others>

The present invention is not limited to the above-described embodiment, and various modifications and applications are possible. The above-described embodiment has been described in detail for the purpose of an easy-to-understand explanation of the present invention, and is not necessarily limited to those including all the configurations described above.

The embodiment and various modifications described above are merely examples, and the present invention is not limited to these contents as long as the features of the invention are not impaired.

For example, in the above-described embodiment, the abnormal position determination unit 104 is mounted independently of the first comparison unit 102 and the second comparison unit 103, but it may be mounted as a part of other arithmetic portions including the first comparison unit 102 and the second comparison unit 103, and it can be appropriately changed in accordance with circumstances at the time of design, circumstances at the time of use, and the like.

In addition, in the above-described embodiment, the method of performing the abnormal position determination by comparing the arithmetic results at the time T and at the time T+1 has been described, but it is possible to perform the abnormality determination by comparing the position information and the prediction position information at a plurality of times, for example, the times T, T+1, T+2, and the like.

In this case, it is desirable to use a different reference value for each of the reference value (threshold value) used for each comparison at the time T, the reference value (threshold value) used for each comparison at the time T+1, and the reference value (threshold value) used for each comparison at the time T+2. In addition, it is common that the farther the time is, the larger the deviation of prediction becomes, and hence it is desirable that the farther the time is, the larger the reference value is made.

Although the case where the external information observation equipment group 1 is configured by the two sensors has been described, the number of sensors is not limited to two, and input from three or more sensors can be received.

For example, when there are three sensors, the abnormality determination result 107 can be obtained by performing the time synchronization processing of the three sensor inputs in the sensor fusion processing unit 4, obtaining the own vehicle surrounding maps 7 and 9, and the surrounding object prediction map 8 at the time T+1, and comparing, in the first comparison unit 102, the correction values of the three sensors at the time T+1 with the surrounding object prediction map 8, or performing a majority comparison.

In addition to this, it is possible to perform the same processing as the above embodiment upon receiving input of any two sensors of the three sensors, to perform the same processing as the above embodiment upon receiving input of the two sensors of the remaining one sensor and one of the two sensors, and to execute the abnormality response processing by using the two abnormality determination results 107.

Also in the case where there are four or more sensors, the inputs of all the sensors may be used as they are, or a plurality of systems using any two inputs can be provided, and thus various modifications are possible.

Furthermore, in the above-described embodiment, the case where the electronic control device is for an automatic drive system has been described, but the application of the electronic control device of the present invention is not limited to an automatic drive system, and the present invention can be applied to various electronic control devices requiring verification of the sensor and processing in the ECU upon receiving input from a plurality of sensors.

REFERENCE SIGNS LIST 1 external information observation equipment group
2 automatic drive ECU
3 low-level ECU group
4 sensor fusion processing unit
5 behavior prediction processing unit
6 own vehicle trajectory plan processing unit
7 own vehicle surrounding map at time T
8 surrounding object prediction map at time T+1 calculated at time T
9 own vehicle surrounding map at time T+1
10 storage device
11 first sensor
12 second sensor
13 map information
14 own vehicle position sensor
15 display device
21 microcomputer
31 brake control device
32 engine control device
33 steering control device
41 time synchronization processing unit
42 first sensor correction data
43 second sensor correction data
71 own vehicle position at time T
72 other vehicle position at time T
73 bicycle position at time T
74 pedestrian position at time T
82 other vehicle prediction position at time T+1 calculated at time T
83 bicycle prediction position at time T+1 calculated at time T
84 pedestrian prediction position at time T+1 calculated at time T
101 prediction storage unit
102 first comparison unit
103 second comparison unit
104 abnormal position determination unit
105 first comparison unit output
106 second comparison unit output
107 abnormality determination result

The invention claimed is:

1. An electronic control device, comprising:
 a sensor fusion processor that integrates, into a vehicle surrounding map, a plurality of pieces of sensor information having been input from a plurality of sensors, wherein the vehicle surrounding map comprises mappings of a plurality of surrounding objects;
 a behavior prediction processor that obtains a future value of a surrounding object prediction map in which a future behavior of a target object is predicted based on the vehicle surrounding map integrated by the sensor fusion processor;
 a first comparator that compares the future value of the surrounding object prediction map predicted by the behavior prediction processor with output information of each sensor of the sensor fusion processor at a predicted time, wherein the output information comprises at least one sensor correction data of a first sensor of the plurality of sensors at the predicted time, and wherein the at least one sensor correction data of the first sensor is determined based on interpolating an input value of the first sensor before the predicted time and after the predicted time; and
 a second comparator that compares the future value of the surrounding object prediction map predicted by the behavior prediction processor with the vehicle surrounding map at the predicted time.

2. The electronic control device according to claim 1, wherein the future behavior of the target object is predicted further based on extrapolating a future position of the target object based on the current position and speed of the target object.

3. The electronic control device according to claim 1, wherein the first comparator further determines reliability of the future value of the surrounding object prediction map by comparing the future value of the surrounding object prediction map having been input with the output information of each sensor of the sensor fusion processor at the predicted time.

4. The electronic control device according to claim 1, wherein the second comparator determines reliability of the output information of the sensor fusion processor by comparing the future value of the surrounding object prediction map having been input with the output information of the sensor fusion processor at the predicted time.

5. The electronic control device according to claim 1, further comprising:
    an abnormal position determinator that determines at least one of the sensor, the sensor fusion processor, the first comparator, and the second comparator has an abnormality based on the output information of the first comparator and the second comparator.

6. The electronic control device according to claim 3, wherein the first comparator or the second comparator determines that reliability has been reduced when a comparison result is determined to have equal to or less than a predetermined accuracy.

7. The electronic control device according to claim 6, wherein the first comparator or the second comparator determines that reliability has been reduced when a comparison result is determined to have equal to or less than a predetermined accuracy for equal to or more than a predetermined number of times in a row.

8. The electronic control device according to claim 6, wherein when a reduction in reliability is detected, the reduction in reliability of the electronic control device is notified on a display device.

9. The electronic control device according to claim 6, further comprising:
    a storage device that leaves a determination record when a reduction in reliability is detected.

10. The electronic control device according to claim 9, wherein the storage device leaves a determination record of a specified time before and after a time of detection of a reduction in reliability.

11. The electronic control device according to claim 6, wherein the electronic control device is used for an automatic drive system of an automobile, and when a reduction in reliability is detected, the reduction in reliability of the electronic control device is notified to a person on board on the automobile.

12. The electronic control device according to claim 11, wherein the sensor to be used includes at least one of a radar and a camera.

* * * * *